(12) United States Patent
Van Nieuwenhove et al.

(10) Patent No.: US 8,591,796 B2
(45) Date of Patent: Nov. 26, 2013

(54) METHODS AND APPARATUS FOR MOLDING AND CURING OF COMPOSITES

(75) Inventors: Stefaan Guido Van Nieuwenhove, Hohenkammer (DE); Bruno Betoni Parodi, Rio de Janeiro (BR); Julian Thomas O'Flynn, Munich (DE); Thomas Kluge, Lenggries (DE); Thomas Koerwien, Hoehenkirchen-siegertsbrunn (DE)

(73) Assignee: General Electric Company, Niskayuna, NY (US)

( * ) Notice: Subject to any disclaimer, the term of this patent is extended or adjusted under 35 U.S.C. 154(b) by 91 days.

(21) Appl. No.: 13/217,586

(22) Filed: Aug. 25, 2011

(65) Prior Publication Data

US 2013/0049266 A1    Feb. 28, 2013

(51) Int. Cl.
*B29C 70/40* (2006.01)
*B29C 35/02* (2006.01)
*B29C 35/04* (2006.01)

(52) U.S. Cl.
USPC ........... 264/314; 264/570; 264/571; 264/316; 264/313; 264/257; 425/389

(58) Field of Classification Search
USPC ................. 264/314, 570, 571, 316, 313, 257; 425/389
See application file for complete search history.

(56) References Cited

U.S. PATENT DOCUMENTS

| | | | |
|---|---|---|---|
| 4,399,100 A | 8/1983 | Zsolnay et al. | |
| 5,032,525 A | 7/1991 | Lee et al. | |
| 5,219,498 A | 6/1993 | Keller et al. | |
| 7,497,981 B2 | 3/2009 | Graham | |
| 2007/0164479 A1* | 7/2007 | Lopez | 264/314 |
| 2008/0211145 A1 | 9/2008 | Graham | |
| 2011/0297308 A1* | 12/2011 | Makin et al. | 156/245 |
| 2013/0187314 A1* | 7/2013 | Aravamudan | 264/571 |

OTHER PUBLICATIONS

Larsen, E.B., Cairns, D.S., Mandell, J.F., and Samborsky, D.D., "Investigation of a Two-Stage Resin Injection Process to Reduce Effects of In-Plane Resin Flow", Wind 2002-26, pp. 40-46. 2002 ASME Wind Energy Symposium, ASME/AIAA.*

* cited by examiner

*Primary Examiner* — Joseph S Del Sole
*Assistant Examiner* — Lawrence D Hohenbrink, Jr.
(74) *Attorney, Agent, or Firm* — Scott J. Asmus

(57) ABSTRACT

In accordance with one aspect of the present invention, methods for molding and curing of composite articles are provided. In one embodiment, the method includes providing a molding apparatus including an elastic layer disposed on a rigid support and a mold disposed on the elastic layer and the support. In one embodiment, the mold includes an inner surface, the inner surface further including a molding surface, and wherein a first surface of the elastic layer and the inner surface of the mold define a molding chamber. In one embodiment, a prepreg is further disposed within the molding chamber, wherein the prepreg is disposed on the first surface of the elastic layer. In one embodiment, the method includes providing a fluid via a fluid inlet against a second surface of the elastic layer, thereby expanding the elastic layer against the inner surface of the mold, and pushing the prepreg against the molding surface of the mold to form a molded composite article. In one embodiment, the method further includes curing the molded composite article in the molding chamber to form a cured composite article. An apparatus for molding and curing of composite articles is also provided.

12 Claims, 4 Drawing Sheets

METHODS AND APPARATUS FOR MOLDING AND CURING OF COMPOSITES

BACKGROUND

The present disclosure relates to methods and apparatus for molding and curing of composites. More particularly, the present disclosure relates to methods and apparatus for pressurized molding and curing of composites.

Composite materials may be typically used in aerospace applications, marine applications, wind turbine applications, and other applications where high strength and relatively light weight may be desired. Composites typically include reinforcing material (for example, fibers) and a matrix (for example, polymer) as the two principal elements. The matrix may include thermosets or thermoplastic materials.

Composite materials may be formed into the desired components by molding and subsequent curing. Typically, a molded composite is formed using a mold and then transferred to an autoclave for curing, where a combination of heat and pressure is applied to the molded composite. However, processing large and/or thick solid composite parts, such as wind energy turbine blades, may not be feasible or easily managed in an autoclave. Further, the molding and subsequent curing in an autoclave may require the additional step of transferring the molded composite to an autoclave.

Thus, there is a need for improved methods and systems for molding and curing of composites. Further, there is a need for improved methods and systems for molding and curing of large-sized composites.

BRIEF DESCRIPTION

In accordance with one aspect of the present invention, a method of manufacturing a cured composite article is provided. In one embodiment, the method includes providing a molding apparatus including an elastic layer disposed on a rigid support and a mold disposed on the elastic layer and the support. In one embodiment, the mold includes an inner surface, the inner surface further including a molding surface, and wherein a first surface of the elastic layer and the inner surface of the mold define a molding chamber. In one embodiment, a prepreg is further disposed within the molding chamber, wherein the prepreg is disposed on the first surface of the elastic layer. In one embodiment, the method includes providing a fluid via a fluid inlet against a second surface of the elastic layer, thereby expanding the elastic layer against the inner surface of the mold, and pushing the prepreg against the molding surface of the mold to form a molded composite article. In one embodiment, the method further includes curing the molded composite article in the molding chamber to form a cured composite article.

In accordance with one aspect of the present invention, a method of manufacturing a cured composite article is provided. In one embodiment, the method includes providing a molding apparatus including an elastic layer disposed on a rigid support and a mold disposed on the elastic layer and the support. In one embodiment, the mold includes an inner surface, the inner surface further including a molding surface, and wherein a first surface of the elastic layer and the inner surface of the mold define a molding chamber. In one embodiment, a prepreg is further disposed within the molding chamber, wherein the prepreg is disposed on the first surface of the elastic layer. In one embodiment, the method includes providing a fluid via a fluid inlet against a second surface of the elastic layer, thereby expanding the elastic layer against the inner surface of the mold, and pushing the prepreg against the molding surface of the mold to form a molded composite article. In one embodiment, the method further includes applying a positive pressure to the fluid and heating the fluid to a cure temperature, thereby curing the molded composite article in the molding chamber to form a cured composite article.

In accordance with yet another aspect of the present invention, an apparatus for manufacturing a cured composite article is provided. In one embodiment, the apparatus includes an elastic layer disposed on a rigid support and a mold disposed on the elastic layer and the support. In one embodiment, the mold includes an inner surface, the inner surface further including a molding surface, and wherein a first surface of the elastic layer and the inner surface of the mold define a molding chamber. In one embodiment, the molding chamber is configured to receive a prepreg disposed on the first surface of the elastic layer. In one embodiment, the apparatus further includes at least one fluid port configured to provide a fluid against a second surface of the elastic layer, thereby expanding the elastic layer against the inner surface of the mold, and pushing the prepreg against the molding surface of the mold to form a molded composite article. In one embodiment, the apparatus further includes at least one heating element configured to cure the molded composite article and form the cured composite article.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include methods and apparatus suitable for molding and curing of composites. In some embodiments, the methods and apparatus of the present invention advantageously allow for continuous molding and curing in the molding apparatus and may obviate the step of transferring the molded component to a curing system. Further, in some embodiments, the methods and apparatus of the present invention advantageously allow for molding and curing of the composite in the molding apparatus itself and obviate the use of autoclaves.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise.

Figure 1:
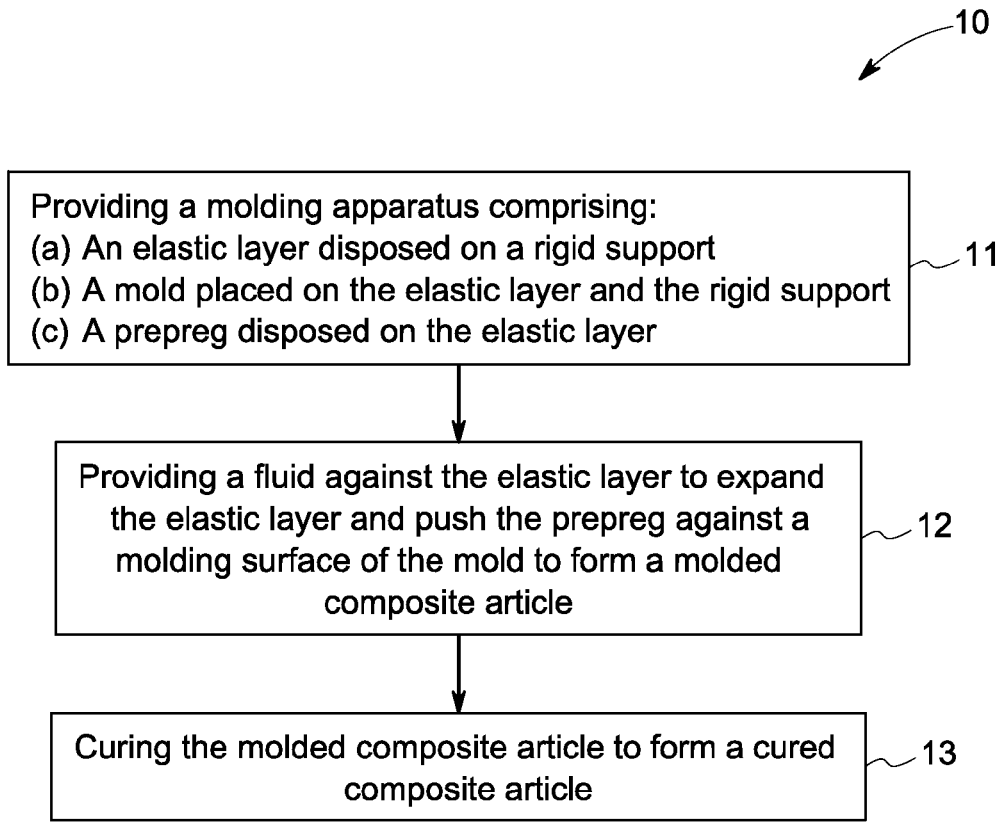
FIG. 1 is a flow chart of a method for molding and curing of a composite, in accordance with one embodiment of the invention.
Figure 4:
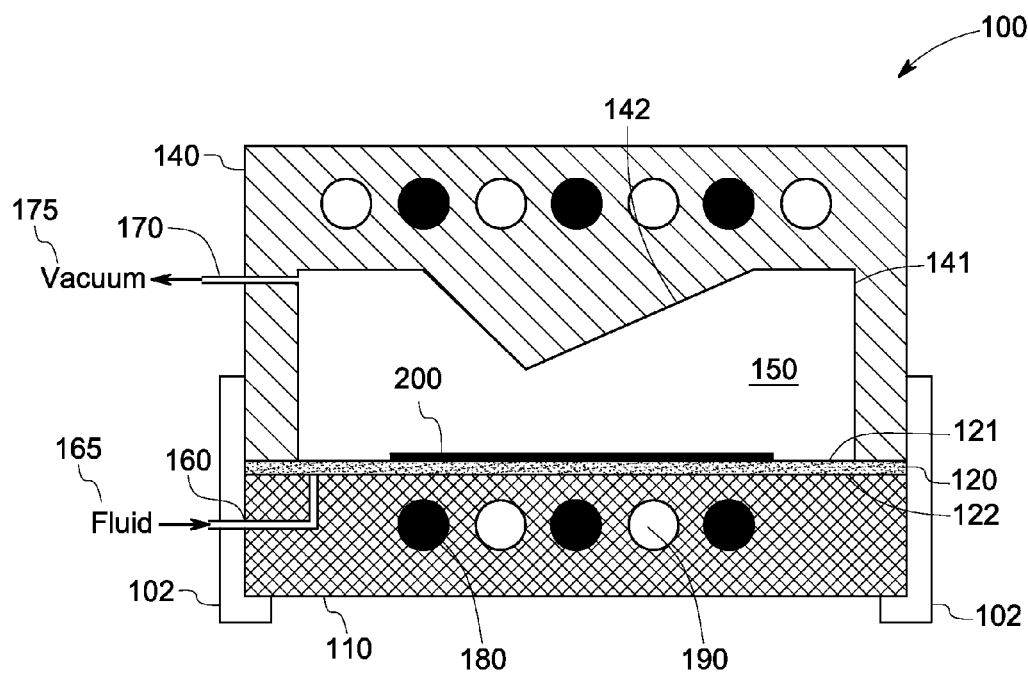
FIG. 4 is a schematic of an assembled apparatus for molding and curing of a composite, in accordance with one embodiment of the invention.

In one embodiment, as shown in FIGS. 1 and 4, a method 10 for manufacturing a cured composite article is provided. In one embodiment, the method 10 includes, at step 11, providing a molding apparatus 100. In one embodiment, the molding apparatus 100 includes an elastic layer 120 disposed on a rigid support 110, as indicated in FIG. 4.

Figure 5:
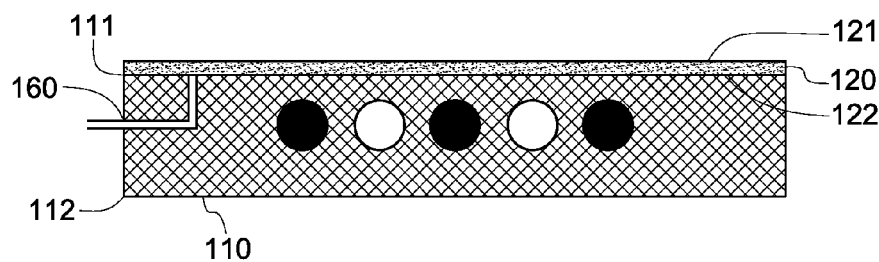
FIG. 5 is a schematic of an enlarged side-view of the rigid support and elastic layer, in accordance with one embodiment of the invention.

FIG. 5 further illustrates a disassembled molding apparatus showing an enlarged side-view of the elastic layer 120 disposed on the rigid support 110. As indicated in FIG. 5, the elastic layer includes a first surface 121 and a second surface 122, in one embodiment. In one embodiment, the rigid support 110 includes a first surface 111 and a second surface 112. As indicated in FIG. 1, a second surface 122 of the elastic layer 120 is disposed on the first surface 111 of the rigid support 110, in one embodiment.

In some embodiments, the second surface 122 of the elastic layer 120 is disposed such that the second surface 122 is contiguous to or in direct contact with the first surface 111 of the rigid support 110, as indicated in FIG. 5. In some other embodiments, the second surface 122 of the elastic layer 120 is disposed such that there is a gap between the second surface 122 of the elastic layer 120 and the first surface 111 of the rigid support 110. In such embodiments, the second surface 122 of the elastic layer 120 and the first surface 111 of the rigid support 110 define a volume (not shown). In some embodiments, as described herein later, the volume is configured to receive a fluid.

In some embodiments, the rigid support 110 may have a size and configuration suitable to support a mold 140 and the composite article to be molded, as described herein later. In some embodiments, the dimensions (width and length) of the rigid support 110 may be chosen to be in accordance with the dimensions of the composite article being molded. As noted earlier, in some embodiments, the molding apparatus 100 may be advantageously used to mold large composite articles. Accordingly, the first surface 111 of the rigid support 110 may be quite large and range from a few square feet to hundreds of square feet, in some embodiments.

In some embodiments, the rigid support 110 may include an inflexible material. In some embodiments, the rigid support may include steel alloys typically used to make autoclaves and pressurized molds. In some other embodiments, the rigid support may include a composite material, such that that the material is sufficiently rigid to withstand the pressurization force exerted during the molding step. As noted earlier, the rigid support 110 includes an inflexible or rigid surface 111 on which the elastic layer 120 is disposed. In some embodiments, the first surface 111 may be flat, as indicated in FIG. 5. In some other embodiments, the first surface 111 may be curved or similar shape (not shown). In some embodiments, the rigid support 110 may include a table having a substantially flat surface 111.

In some embodiments, the rigid support 110 may further include one or more ports. In some embodiments, one or more of the ports may be suitable as vacuum ports, ports for thermocouples, sensor leads, ports for resin infusion, ports for circulation of heating or cooling fluids, or as ports for heating or cooling devices. In some embodiments, the ports may be located in the rigid support 110 to avoid interference with the elastic layer 120 and the mold 140. In particular embodiments, the rigid support 110 includes at least one fluid inlet 160, as described herein later.

The term "elastic layer" as used herein refers to a layer that is capable of returning to its original shape or size after being stretched, deformed, compressed, or expanded. In some embodiments, the elastic layer 120 may be capable of stretching from 100% to 800% of its original size. In some embodiments, the elastic layer 120 may be capable of stretching from 100% to 600% of its original size. In some embodiments, the elastic layer 120 may be capable of stretching from 100% to 500% of its original size. In some embodiments, the width and length of the elastic layer 120 in a relaxed state is chosen to match the rigid support 110. The thickness of the elastic layer 120 may be varied depending upon the particular elastic material used and the expected pressure levels in the apparatus, in some embodiments.

In some embodiments, the elastic layer 120 includes a strong, elastic material that is impermeable to gas, fluid, or both. In some embodiments, the elastic layer 120 includes thermosets, such as, silicone, neoprene, SBR, butyl or nitrile rubbers. In some embodiments, the elastic layer 120 includes flexible thermoplastic materials, such as, nylon, polypropylene, or polyethylene.

In one embodiment, the molding apparatus 100 further includes a mold 140 disposed on the elastic layer 120 and the support 110, as indicated in FIG. 4. In some embodiments, the mold 140 includes an inner surface 141, as indicated in FIG. 4. In some embodiments, the inner surface 141 of the mold 140 further includes a portion that defines a molding surface 142. In some embodiments, the mold's inner surface 141 may be machined or otherwise shaped to provide a molding surface or contour 142. Further, in some embodiments, the molding surface 142 may include a convex or a concave profile. In some embodiments, the molding surface or contour 142 includes a profile in accordance with the composite article to be molded.

In some embodiments the mold 140 may have a size and configuration suitable for the composite article to be molded, as described herein later. The dimensions (width and length) of the mold 140 may be chosen to be in accordance with the dimensions of the composite article being molded. As noted earlier, in some embodiments, the molding apparatus 100 may be advantageously used to mold large composite articles. Accordingly, the inner surface 141 of the mold 140 may be quite large and range from a few square feet to hundreds of square feet, in some embodiments.

In some embodiments, the mold 140 may include an inflexible material. In some embodiments, the mold 140 may include steel alloys typically used to make autoclaves and pressurized molds. In some other embodiments, the mold 140 may include a composite material, such that that the material is sufficiently rigid to withstand the pressurization force exerted during the molding step.

In some embodiments, the mold 140 may further include one or more ports. In some embodiments, one or more of the ports may be suitable as vacuum ports, ports for thermocouples, sensor leads, ports for circulation of heating or cooling fluids, or as ports for heating or cooling devices. In some embodiments, the ports may be located in the mold 140 to avoid interference with the elastic layer 120 and the prepreg 200, as described herein later. In particular embodiments, the mold 140 includes at least one vacuum port 170, as described herein later.

In some embodiments, as indicated in FIG. 4, the inner surface of the mold 140 and the first surface 121 of the elastic layer define a molding chamber 150. Further, in some embodiments, a prepreg 200 is disposed within the molding chamber 150, as indicated in FIG. 4. The term "prepreg", as used herein, refers to a reinforcing material impregnated with a resin. In some embodiments, the reinforcing material includes a fibrous material. In some embodiments, the fibrous material may be in the form of a woven fabric, a non-woven, or roving. In some embodiments, the resin includes a thermoset material. In some other embodiments, the resin includes a thermoplastic.

As noted earlier, the elastic layer 120 includes a first surface 121 and the prepreg 200 is disposed within the molding chamber 150 such that the prepreg 200 is disposed in contact with the first surface 121 of the elastic layer 120. In some embodiments, the method 10 further includes a step of disposing a prepreg 200 in the molding chamber 150.

Figure 2:
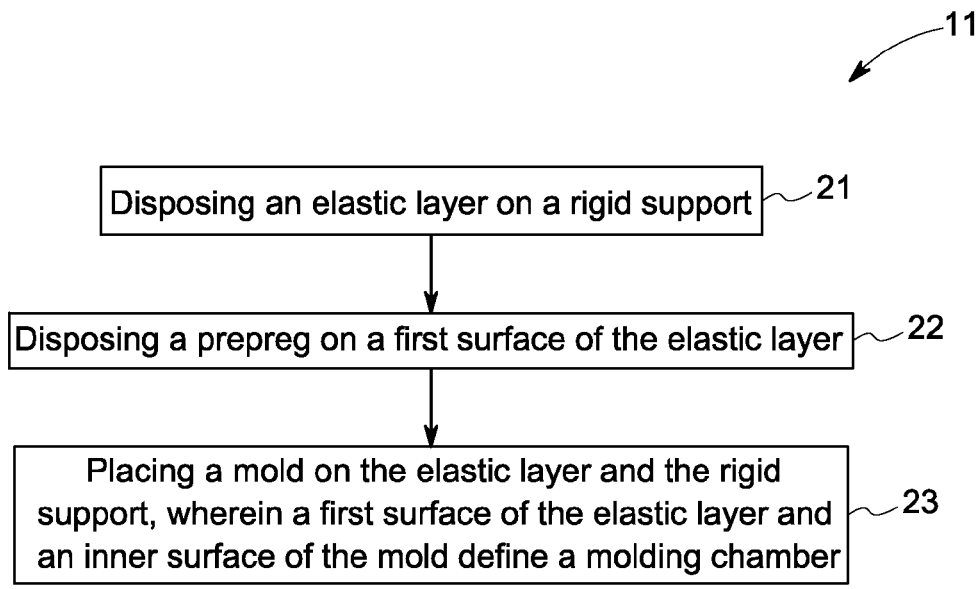
FIG. 2 is a flow chart of a molding step, in accordance with one embodiment of the invention.

In some embodiments, as indicated in FIG. 2, the step 11 of providing a molding apparatus 100 includes disposing the elastic layer 120 on the rigid support 110, at step 21. In some embodiments, the step 11 further includes the step of disposing a prepreg 200 on the first surface 121 of the elastic layer 120, at step 22. In some embodiments, a pre-fabricated prepreg 200 may be disposed on the first surface 121 of the elastic layer 120. In some other embodiments, the step 22 may include disposing a reinforcing material on the first surface 121 of the elastic layer 122 followed by impregnation of the reinforcing material with a resin to form the prepreg 200. In some embodiments, the step 23 further includes placing a mold 140 on the first surface of the elastic layer 120, at step 23, as indicated in FIG. 4. In such embodiments, the prepreg 200 may be disposed on the elastic layer 120 before positioning the mold 140.

In some other embodiments, the step 11 of providing a molding apparatus includes placing a reinforcing material on the first surface 121 of the elastic layer 120 followed by positioning a mold 140 on the elastic layer (not shown). In such embodiments, the step 11 may further include injecting a resin via one or more resin infusion ports that may be present in the rigid support 110 (not shown).

In some embodiments, the method 10 further includes securing the mold 140 to the rigid support 110 after the step of placing the mold 140 on the elastic layer 120. In some embodiments, the mold 140 may be secured to the rigid support using two or more clamping devices 102, as indicated in FIG. 4. In some embodiments, the mold 140 is secured to the rigid support 110 such that the molding apparatus 100 is completely sealed and there is no leakage of fluid used for molding, as described herein later. In some embodiments, the mold 140 is secured to the rigid support 110 such that there is no leakage between the elastic layer 120 and the mold 140.

Figure 7:
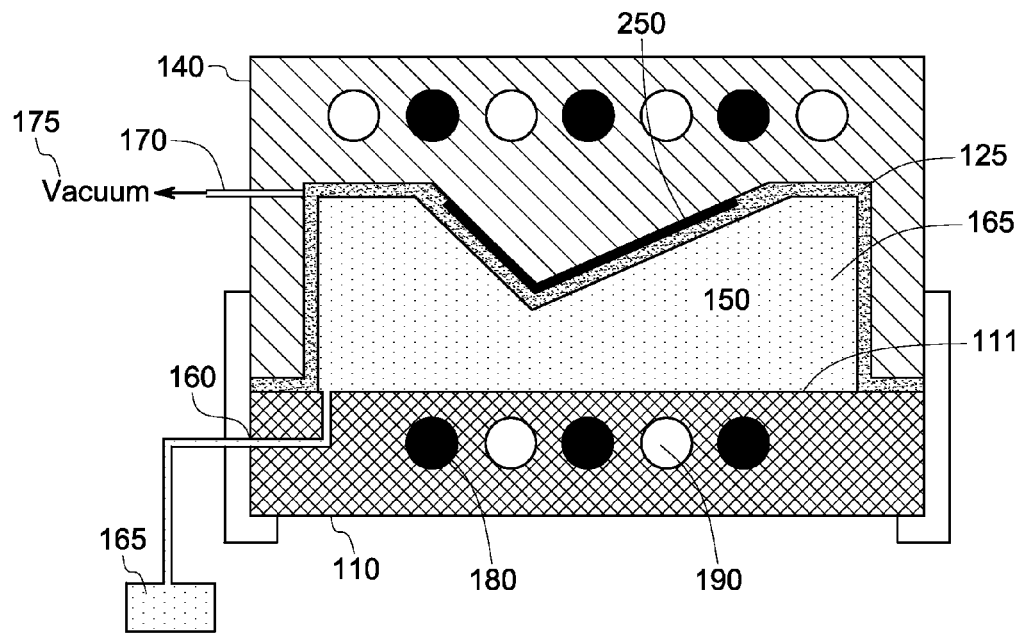
FIG. 7 is a schematic of a pressurized apparatus for molding and curing of a composite, in accordance with one embodiment of the invention.

In one embodiment, as indicated in FIGS. 1 and 4, the method 10 further includes, at step 12, providing a fluid 165 via a fluid inlet 160 against a second surface 122 of the elastic layer 120. FIG. 4 shows a relaxed state of the elastic layer 120 prior to the application of fluid against its second surface 122. FIG. 7 shows a pressurized state of the elastic layer 120 after the application of fluid 165 against it second surface. As indicated in FIG. 7, the application of fluid against the second surface 122 of the elastic layer 120 results in application of pressure of against the second surface of the 122 of the elastic layer 120, thereby expanding the elastic layer 120 to form an expanded elastic layer 125, as indicated in FIG. 7.

In some embodiments, the expanded elastic layer 125 lifts away from the first surface 111 of the rigid support 110. In some embodiments, the fluid 165 applies a pressure against the second surface 122 of the elastic layer 120 such that the elastic layer 120 is expanded against the inner surface 141 of the mold 140, as indicated in FIG. 7. In some embodiments, the fluid 165 fills the molding chamber 150, as indicated in FIG. 7.

In some embodiments, the application of fluid 165 against the second surface 122 of the elastic layer 120 further results in pushing the prepreg 200 against the molding surface 142 of the mold 140, as indicated in FIG. 7. In some embodiments, the prepreg 200 is molded or formed into a shape in accordance with a profile of the molding surface 142 of the mold 140. In some embodiments, the method includes forming a molded composite article 250, as indicated in FIG. 7.

In some embodiments, the fluid 165 includes an inert gas, a liquid, or combinations thereof. In some embodiments, the fluid 165 includes water. In some embodiments, the fluid 165 includes air. In some embodiments, the fluid 165 includes an inert gas, such as, for example argon.

In some embodiments, the step 12 of applying a fluid further includes applying a positive pressure to the fluid 165. In some embodiments, the fluid 165 may be pressurized using a suitable pressurization system at the desired pressure level before the application of fluid 165 against the second surface 122 of the elastic layer 120. In some embodiments, a pressure of the fluid 165 applied to the second surface 122 of the elastic layer 120 is greater than about 1 bar. In some embodiments, a pressure of the fluid 165 applied to the second surface 122 of the elastic layer 120 is greater than about 2 bar. In some embodiments, a pressure of the fluid 165 applied to the second surface 122 of the elastic layer 120 is greater than about 5 bar.

In some embodiments, the at least one fluid port 160 is configured to provide the fluid 165 against the second surface 122 of the elastic layer 120 at a pressure greater than about 1 bar. It should be noted that the fluid port 165 configuration in FIG. 7 is shown as an exemplary embodiment only. In some embodiments, a plurality of fluid ports 165 may be employed to provide the fluid 165 against the second surface 122 of the elastic layer 120.

In some embodiments, the method 10 may further include a step of applying a vacuum 175 to the molding chamber 150. In some embodiment, the vacuum may be applied prior to step 12, during step 12, or after step 12. In some embodiments, the mold 140 may further include one or more vacuum ports 170 and a vacuum 175 may be applied to the molding chamber 150 using one or more of these ports 170, as indicated in FIG. 7. In some embodiments, application of vacuum 175 to the molding chamber 150 further pulls the first surface 121 of the elastic layer 120 towards the inner surface 142 of the mold 140. In some embodiments, the method 10 includes a combination of application of pressurized fluid 165 against the elastic layer 120 and application of vacuum 175 to the molding chamber 150.

In some embodiments, the method 10 may further include heating one or more of the rigid support 110, the mold 140, or the fluid 165 during step 12 of applying the fluid 165 against the second surface 121 of the elastic layer 120. In some embodiments, heating the support 110, the mold 140, or the fluid 165 may provide for improved molding of the molded composite article 250. In some embodiments, the temperature of the support 110, the mold 140, or the fluid 165 may be maintained such that the curing of the prepreg 200 is not effected during the molding step 12.

In one embodiment, as indicated in FIG. 1, the method 10 further includes curing the molded composite article 250 in the molding chamber 150 to form a cured composite article 300. As noted earlier, the methods and apparatus of the present invention advantageously allow for continuous molding and curing of composites without the need for transferring the molded composite article 250 to a separate curing system and use of autoclaves.

In some embodiments, the curing of the molding composite article 250 may be effected by heating one or more of the rigid support 110, the mold 140, or the fluid 165. As noted earlier, in some embodiments, the rigid support 110, the mold 140, or both may include one or more heating elements 180. In some embodiments, the one or more heating elements 180 may be configured to directly effect curing of the molded composite article 250. In some embodiments, wherein the mold 140 includes one or more heating elements 180, the heating elements 180 may be used for heating the mold 140 and the molding surface 142 of the mold 140 such that curing of the molded composite article 250 is effected.

In particular embodiments, the one or more heating elements 180 present in the rigid support 110 may be configured to provide heating to the fluid 165 disposed in the molding chamber 140 and the heated fluid 165 may provide heat to the molded composite article 250 to effect curing. In some embodiments, the method 10 includes heating the fluid 165 to a cure temperature to effect curing of the molded composite article 250.

In some embodiments, the fluid 165 may be heated to a first temperature before the step 12 of applying the fluid 165 against the second surface 122 of the elastic layer 120. In such embodiments, the first temperature may be lower than the cure temperature. In some the embodiments, the fluid 165 may be further heated to a second temperature during the step 13 of curing the molded composite article 250. In such embodiments, the second temperature may be determined by the cure temperature of the molded composite article 250.

In some embodiments, the method 10 may include heating the fluid to the cure temperature and leaving the molding apparatus 100 in the pressurized state for a time period until the desired curing is achieved. In some embodiments, after the step 13 of curing the molded composite article, the molding apparatus 100 may be further cooled. In some embodiments, the method 10 further includes cooling one or more of the rigid support 110, the mold 140, or the fluid 165. As noted earlier, in some embodiments, the rigid support 110, the mold 140, or both may include one or more cooling elements 190. In some embodiments, the one or more cooling elements 190 may be configured to cool the fluid 165, the cured composite article 300, or both.

Figure 8:
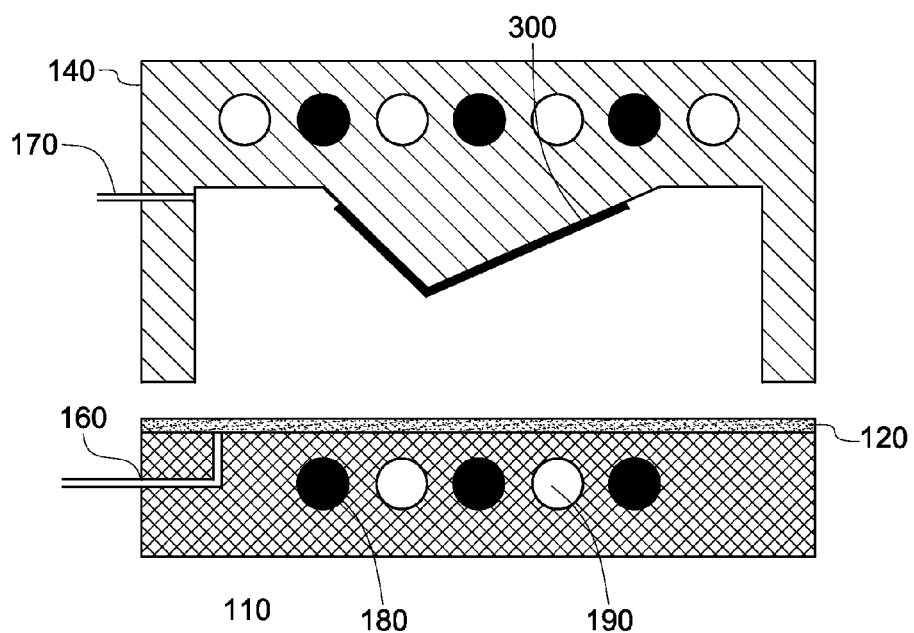
FIG. 8 is a schematic of a disassembled apparatus for molding and curing of a composite, in accordance with one embodiment of the invention.

In some embodiments, the method 10 may further include discharging the fluid 165 from the molding chamber 150 using a suitable outlet (not shown) and releasing the pressure on the elastic layer 120. In such embodiments, the elastic layer 120 may return to its original relaxed state and the cured composite article 300 may be removed from the molding apparatus 100, as indicated in FIG. 8.

Figure 3:
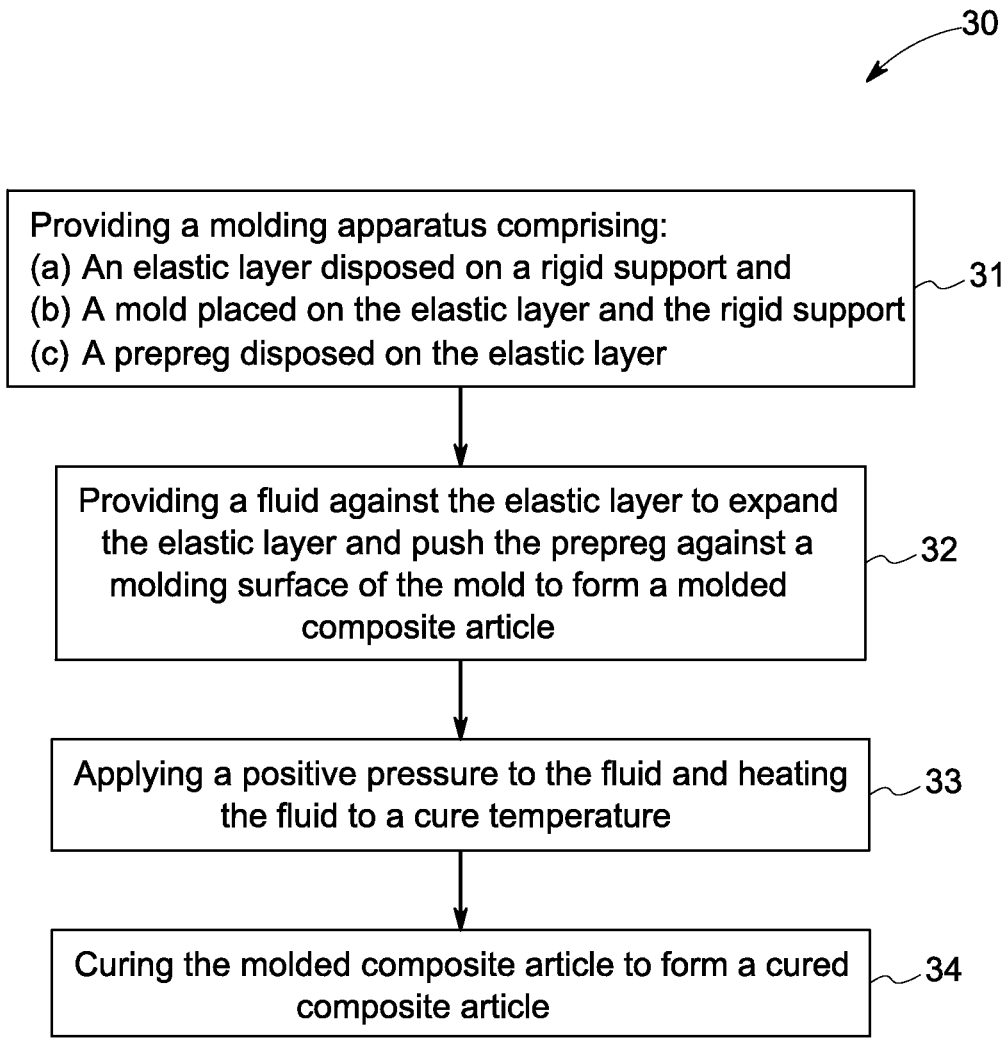
FIG. 3 is a flow chart of a method for molding and curing of a composite, in accordance with one embodiment of the invention.

In one embodiment, as indicated in FIGS. 3 and 4, a method 30 of manufacturing a cured composite article is provided. The method 30 includes, at step 31, providing a molding apparatus 100. In some embodiments, the molding apparatus 100 includes an elastic layer 120 disposed on a rigid support 110. In some embodiments, the molding apparatus 100 further includes a mold 140 disposed on the elastic layer 120 and the support 110, wherein the mold 140 comprises an inner surface 141, the inner surface 141 further comprising a molding surface 142.

In some embodiments, a first surface 121 of the elastic layer 120 and the inner surface 141 of the mold 140 define a molding chamber 150. In some embodiments, a prepreg 200 is further disposed within the molding chamber 150. In some embodiments, the prepreg 200 is disposed on the first surface 121 of the elastic layer 120.

In one embodiment, as indicated in FIGS. 3 and 4, the method 30 includes, at step 31, providing a fluid 165 via a fluid inlet 160 against a second surface 122 of the elastic layer 120. In some embodiments, the method 30 includes expanding the elastic layer 120 against the inner surface 141 of the mold 140, as indicated in FIG. 7. In some embodiments, the method 30 further includes pushing the prepreg 200 against the molding surface 142 of the mold 141 to form a molded composite article 250, as indicated in FIG. 7.

In one embodiment, as indicated in FIG. 3, the method further includes, at step 33, applying a positive pressure to the fluid 165 and heating the fluid 165 to a cure temperature. In one embodiment, as indicated in FIG. 3, the method further includes, at step 34, curing the molded composite article 250 in the molding chamber 150 to form a cured composite article 300.

In one embodiment, as indicated in FIGS. 4 and 8, an apparatus 100 for manufacturing a cured composite article 300 is provided. In some embodiments, the apparatus 100 includes an elastic layer 120 disposed on a rigid support 100 and a mold 140 disposed on the elastic layer 120 and the rigid support 100. In some embodiments, as indicated in FIG. 4, the mold 140 includes an inner surface 141. In some embodiments, the inner surface 141 further includes a molding surface 142, as indicated in FIG. 4.

Figure 6:
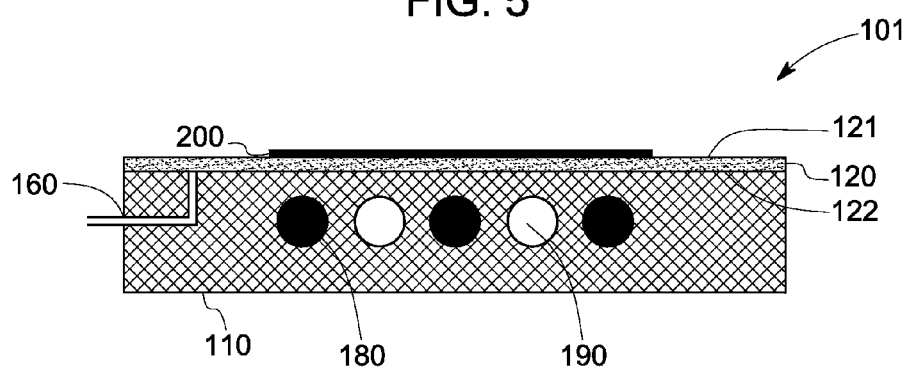
FIG. 6 is a schematic of an enlarged side-view of the rigid support, the elastic layer and the prepreg, in accordance with one embodiment of the invention.

Further, in some embodiments, a first surface 121 of the elastic layer 120 and the inner surface 141 of the mold 140 defines a molding chamber 150. In some embodiments, the molding chamber 150 is configured to receive a prepreg 200 disposed on the first surface 121 of the elastic layer 120, as indicated in FIGS. 4 and 6.

In one embodiment, the apparatus 100 further includes at least one fluid port 160. As noted earlier, in some embodiments, the rigid support 110 includes the fluid port 160. In some embodiments, the at least one fluid port 160 is configured to provide a fluid 165 against a second surface 122 of the elastic layer 120, as indicated in FIGS. 4 and 7. In some embodiments, the fluid port 160 is configured to provide a fluid 165, thereby expanding the elastic layer 120 against the inner surface 141 of the mold 140, and pushing the prepreg 200 against the molding surface 142 of the mold 140 to form a molded composite article 250.

In some embodiments, as noted earlier, the at least one fluid port 160 is configured to provide the fluid 165 against the second surface 122 of the elastic layer 120 at a pressure greater than about 1 bar. In some embodiments, the apparatus 100 further includes a fluid chamber 161 configured to provide the fluid 165 against the second surface 122 of the elastic layer 120 via the fluid port 160.

In one embodiment, the apparatus 100 further includes at least one vacuum port 170 configured to apply a 175 vacuum to the molding chamber 150, thereby pulling the first surface 121 of the elastic layer 120 towards the inner surface 141 of the mold 140.

In one embodiment, the apparatus 100 further includes at least one heating element 180 configured to cure the molded composite article 250, and form the cured composite article 300, as indicated in FIGS. 7 and 8. In some embodiments, the one or more heating elements are configured to heat one or more of the rigid support 110, the mold 140, or the fluid 165.

In one embodiment, the apparatus 100 further includes at least one cooling element 190, as indicated in FIGS. 7 and 8. In some embodiments, the one or more cooling elements 190 are configured to cool one or more of the rigid support 110, the mold 140, or the fluid 165.

In some embodiments, the methods and apparatus of the present invention may be advantageously suitable for making large composite components. In some embodiments, a large composite component is one that has an overall dimension (length+width+thickness) greater than one foot. In some embodiments, the methods and apparatus of the present invention may be used to form a cured composite article 300 selected from the group consisting of wind turbine components, aircraft components, and marine structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manufacturing a cured composite article, comprising:
   (i) providing a molding apparatus comprising:
      (a) an elastic layer disposed on a rigid support,
      (b) a mold disposed on the elastic layer and the support, wherein the mold comprises an inner surface, the inner surface further comprising a molding surface, and wherein a first surface of the elastic layer and the inner surface of the mold define a molding chamber;
   (ii) disposing a prepreg in the molding chamber such that the prepreg is disposed in contact with the first surface of the elastic layer;
   (iii) providing a fluid via a fluid inlet against a second surface of the elastic layer after step (ii), thereby expanding the elastic layer against the inner surface of the mold, and pushing the prepreg against the molding surface of the mold to form a molded composite article; and
   (iv) curing the molded composite article in the molding chamber to form a cured composite article.

2. The method as defined in claim 1, wherein step (iv) comprises heating one or more of the support, the mold, or the fluid.

3. The method as defined in claim 1, wherein step (iv) comprises heating the fluid to a cure temperature to effect curing of the molded composite article.

4. The method as defined in claim 1, wherein step (iv) comprises applying a positive pressure to the fluid.

5. The method as defined in claim 1, wherein a pressure of the fluid is greater than about 1 bar.

6. The method as defined in claim 1, further comprising cooling one or more of the support, the mold, or the fluid.

7. The method as defined in claim 1, wherein step (ii) further comprises applying a vacuum to the molding chamber, thereby pulling the first surface of the elastic layer towards the inner surface of the mold.

8. The method as defined in claim 1, wherein step (ii) further comprises heating one or more of the support, the mold, or the fluid.

9. The method as defined in claim 1, wherein the fluid comprises an inert gas, a liquid, or combinations thereof.

10. The method as defined in claim 1, wherein the prepreg comprises a reinforcing material and a matrix.

11. The method as defined in claim 1, wherein the cured composite article is selected from the group consisting of wind turbine components, aircraft components, and marine structures.

12. A method of manufacturing a cured composite article, comprising:
   (i) providing a molding apparatus comprising:
      (a) an elastic layer disposed on a rigid support,
      (b) a mold disposed on the elastic layer and the support, wherein the mold comprises an inner surface, the inner surface further comprising a molding surface, and wherein a first surface of the elastic layer and the inner surface of the mold define a molding chamber;
   (ii) disposing a prepreg in the molding chamber such that the prepreg is disposed in contact with the first surface of the elastic layer;
   (iii) providing a fluid via a fluid inlet against a second surface of the elastic layer after step (ii), thereby expanding the elastic layer against the inner surface of the mold, and pushing the prepreg against the molding surface of the mold to form a molded composite article; and
   (iv) applying a positive pressure to the fluid and heating the fluid to a cure temperature, thereby curing the molded composite article in the molding chamber to form a cured composite article.

* * * * *